3,522,308
2-TRICHLOROMETHYLMERCAPTO-1,3-DIPHENYL-2-THIOPSEUDOUREA
Gerald L. Bachman and Joseph W. Baker, Kirkwood, Mo., assignors to Monsanto Company, St. Louis, Mo., a corporation of Delaware
No Drawing. Filed Oct. 6, 1967, Ser. No. 673,304
Int. Cl. C07c 129/08
U.S. Cl. 260—564                                         9 Claims

ABSTRACT OF THE DISCLOSURE

This disclosure covers 2-trichloromethylmercapto-1,3-halogenated and unhalogenated diphenyl-2-thiopseudoureas as new chemical compounds. These compounds have been found to be useful in the control of bacteria.

---

This invention relates to a novel class of organic chemical compounds. More particularly, this invention is concerned with novel halogenated and unhalogenated diphenyl thiopseudoureas wherein a trichloromethylthio group is attached to the sulfur atom. Such materials have been found to possess useful and unexpected biological activity. The novel compounds of this invention have the formula

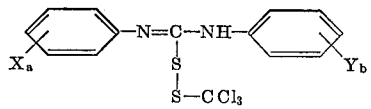

wherein X and Y are each selected from chlorine and bromine, and $a$ and $b$ are each integers from zero to three.

The novel thiopseudoureas of this invention can be readily prepared by reacting a halogenated or unhalogenated thiocarbanilide with trichloromethylsulfenyl chloride. In carrying out such a reaction, it is preferred to first prepare a solution of the thiocarbanilide. A solution of the trichloromethylsulfenyl chloride is then added to yield the desired product. A typical reaction is illustrated by the following equation:

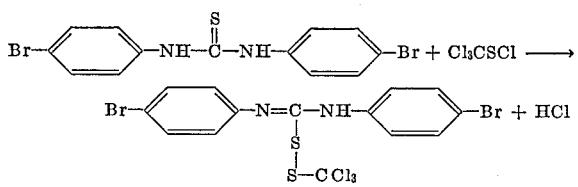

It is preferred to carry out the reaction in the presence of an inert organic solvent. Suitable solvents include benzene, toluene, xylene, the chlorinated benzenes, ethyl ether, propyl ether, tetrahydrofuran, and the like. The reaction temperatures employed in the preparation of the compounds of this invention will vary from room temperature to the reflux temperature of the reaction mixture. The specific temperature employed in any given preparation will be primarily dependent upon the particular reactants used therein.

The invention will be more fully understood by reference to the following examples which are set forth herein for the purpose of illustration only and which are not to be construed as limiting the scope of this invention in any manner.

EXAMPLE 1

A suitable reaction vessel is charged with 11.1 grams (0.03 mole) of 3,3',4,4'-tetrachlorothiocarbanilide and 200 ml. of tetrahydrofuran. Then 5.7 grams (0.03 mole) of trichloromethylsulfenyl chloride in 25 ml. of tetrahydrofuran is added dropwise with stirring at 0° C. Upon completion of the addition, the mixture is stirred at room temperature for 12 hours and heated at reflux temperature for one hour. The solvent is removed from the filtrate by evaporation at reduced pressure leaving a viscous oil. Upon standing, a solid forms and is recrystallized from methylcyclohexane to yield 6.1 grams of 2-trichloromethylmercapto-1,3-bis(3,4 - dichlorophenyl) - 2 - thiopseudourea as a tan solid melting over a range of 116–117° C. Analysis shows 5.1% nitrogen as against a calculated value of 5.4% for $C_{14}H_7Cl_7N_2S_2$.

EXAMPLE 2

Following the detailed procedure set forth in Example 1, there is employed 11.1 grams of 3,3',4,5-tetrachlorothiocarbanilide along with the amount trichloromethylsulfenyl chloride already specified. The product obtained is 2-trichloromethylmercapto-1-(3,4,5-trichlorophenyl)-3-(3-chlorophenyl)-2-thiopseudourea.

EXAMPLE 3

Following the detailed procedure set forth in Example 1, there is employed 9.9 grams of 2',4,4'-trichlorothiocarbanilide along with the amount trichloromethylsulfenyl chloride already specified. The product obtained is 2-trichloromethylmercapto - 1 - (4-chlorophenyl)-3-(2,4-dichlorophenyl)-2-thiopseudourea.

EXAMPLE 4

Following the detailed procedure set forth in Example 1, there is employed 8.9 grams of 3,5-dichlorothiocarbanilide along with the amount trichloro methylsulfenyl chloride already specified. The product obtained is 2-trichloromethylmercapto-1-(3,5 - dichlorophenyl)-3-phenyl-2-thiopseudourea.

EXAMPLE 5

Following the detailed procedure set forth in Example 1, there is employed 7.9 grams of 4'-chlorothiocarbanilide along with the amount trichloromethylsulfenyl chloride already specified. The product obtained is 2-trichloromethylmercapto - 1 - phenyl-3-(4-chlorophenyl) - 2 - thiopseudourea.

EXAMPLE 6

Following the detailed procedure set forth in Example 1, there is employed 12.0 grams of 3,3',4',5,5'-pentachlorothiocarbanilide along with the amount trichloromethylsulfenyl chloride already specified. The product obtained is 2 - trichloromethylmercapto-1-(3,5-dichlorophenyl)-3-(3,4,5-trichlorophenyl)-2-thiopseudourea.

EXAMPLE 7

Following the detailed procedure set forth in Example 1, there is employed 13.9 grams of 3,4,4'-tribromothiocarbanilide along with the amount trichloromethylsulfenyl chloride already specified. The product obtained is 2-trichloromethylmercapto - 1 - (3,4 - dibromophenyl)-3-(4-bromophenyl)-2-thiopseudourea.

As stated above, the products of the present invention are useful as microbiocides adapted to be employed for the control of bacterial organisms. In a representative test, 2-trichloromethylmercapto - 1,3-bis(3,4-dichlorophenyl)-2-thiopseudourea is found to be effective against *Staphylococcus aureus* at a dilution in excess of one part per million. Further, when said compound is admixed with a well-known commercially available anionic detergent in a concentration of 1.0%, its effectiveness can also be demonstrated in a conventional home washing machine. Swatches of cloth innoculated with *Staphylococcus aureus* are found to be free of bacterial growth after laundering with a home washing machine using said admixed detergent. Similar activity is displayed by other and different thiopseudoureas of this invention.

While the invention has been described herein with regard to certain specific embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. A compound of the formula

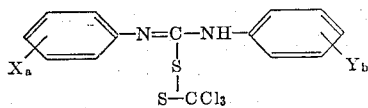

wherein X and Y are each selected from the group consisting of chlorine and bromine, and $a$ and $b$ are each integers from zero to three.

2. A compound as defined in claim 1 wherein X and Y are bromine.

3. A compound as defined in claim 1 wherein X and Y are chlorine.

4. A compound as defined in claim 3 wherein $a+b$ is equal to four.

5. A compound as defined in claim 3 wherein $a+b$ is equal to three.

6. A compound as defined in claim 3 wherein $a+b$ is equal to five.

7. A compound as defined in claim 1 wherein $a+b$ is equal to four.

8. A compound as defined in claim 1 wherein $a+b$ is equal to three.

9. 2-trichloromethylmercapto - 1,3 - bis(3,4- dichlorophenyl)-2-thiopseudourea.

References Cited

UNITED STATES PATENTS 2,980,734  4/1961  Kosmin _____ 260—564

LEON ZITVER, Primary Examiner

G. A. SCHWARTZ, Assistant Examiner

U.S. Cl. X.R.

252—106; 260—999